(12) United States Patent
Karczewicz et al.

(10) Patent No.: US 11,711,548 B2
(45) Date of Patent: *Jul. 25, 2023

(54) FILTERING VIDEO DATA USING A PLURALITY OF FILTERS

(71) Applicant: QUALCOMM Incorporated, San Diego, CA (US)

(72) Inventors: Marta Karczewicz, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,652

(22) Filed: Oct. 5, 2018

(65) Prior Publication Data

US 2019/0089989 A1     Mar. 21, 2019

Related U.S. Application Data

(63) Continuation of application No. 12/406,585, filed on Mar. 18, 2009, now Pat. No. 10,123,050.

(Continued)

(51) Int. Cl.
*H04N 19/85* (2014.01)
*H04N 19/46* (2014.01)
(Continued)

(52) U.S. Cl.
CPC ........... *H04N 19/85* (2014.11); *H04N 19/117* (2014.11); *H04N 19/44* (2014.11); *H04N 19/46* (2014.11); *H04N 19/80* (2014.11)

(58) Field of Classification Search
None
See application file for complete search history.

(56) References Cited

U.S. PATENT DOCUMENTS

| 4,974,065 A | 11/1990 | Murakami et al. |
| 5,610,729 A | 3/1997 | Nakajima |

(Continued)

FOREIGN PATENT DOCUMENTS

| CA | 2547954 A1 | 7/2005 |
| CN | 1450811 A | 10/2003 |

(Continued)

OTHER PUBLICATIONS

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.

(Continued)

*Primary Examiner* — Mohammed Jebari
(74) *Attorney, Agent, or Firm* — Polsinelli LLP (57) ABSTRACT

Systems and methods of filtering video data using a plurality of filters are disclosed. In an embodiment, a method includes receiving and decoding a plurality of filters embedded in a video data bitstream at a video decoder. The method includes selecting, based on information included in the video data bitstream, a particular filter of the plurality of filters. The method further includes applying the particular filter to at least a portion of decoded video data of the video data bitstream to produce filtered decoded video data.

13 Claims, 5 Drawing Sheets

Related U.S. Application Data (60) Provisional application No. 61/094,011, filed on Sep. 3, 2008, provisional application No. 61/079,998, filed on Jul. 11, 2008.

(51) Int. Cl.
  *H04N 19/117* (2014.01)
  *H04N 19/44* (2014.01)
  *H04N 19/80* (2014.01)

(56) References Cited

U.S. PATENT DOCUMENTS

| | | | |
|---|---|---|---|
| 5,798,795 A | 8/1998 | Glenn et al. | |
| 5,802,218 A * | 9/1998 | Brailean | H04N 19/527 |
| | | | 348/E5.077 |
| 5,822,467 A | 10/1998 | Lopez et al. | |
| 5,844,613 A | 12/1998 | Chaddha | |
| 5,844,627 A * | 12/1998 | May | H04N 5/21 |
| | | | 348/625 |
| 5,930,397 A | 7/1999 | Tsujii et al. | |
| 6,188,799 B1 | 2/2001 | Tan et al. | |
| 6,281,942 B1 | 8/2001 | Wang et al. | |
| 6,356,592 B1 | 3/2002 | Naito | |
| 6,370,279 B1 | 4/2002 | Paik | |
| 6,504,872 B1 | 1/2003 | Fimoff et al. | |
| 6,510,252 B1 | 1/2003 | Kishimoto | |
| 6,748,113 B1 | 6/2004 | Kondo et al. | |
| 6,792,152 B1 * | 9/2004 | Shibata | H04N 19/139 |
| | | | 375/E7.135 |
| 6,983,079 B2 | 1/2006 | Kim | |
| 7,003,038 B2 | 2/2006 | Divakaran et al. | |
| 7,076,114 B2 | 7/2006 | Westerman | |
| 7,203,234 B1 | 4/2007 | Zeng | |
| 7,289,154 B2 | 10/2007 | Gindele | |
| 7,391,812 B2 | 6/2008 | Pun et al. | |
| 7,453,938 B2 | 11/2008 | Haskell et al. | |
| 7,460,596 B2 | 12/2008 | Kwon et al. | |
| 7,702,013 B2 | 4/2010 | Schwarz et al. | |
| 7,809,207 B2 | 10/2010 | Dumitras et al. | |
| 7,894,524 B2 | 2/2011 | Demos | |
| 7,903,179 B2 | 3/2011 | Morino | |
| 7,916,965 B2 | 3/2011 | Chiu et al. | |
| 8,086,062 B2 | 12/2011 | Lin et al. | |
| 8,374,246 B2 | 2/2013 | Raveendran et al. | |
| 8,804,833 B2 | 8/2014 | Francois et al. | |
| 8,897,591 B2 | 11/2014 | Wilkins et al. | |
| 8,964,852 B2 | 2/2015 | Chong et al. | |
| 8,964,853 B2 | 2/2015 | Chong et al. | |
| 8,982,960 B2 | 3/2015 | Chong et al. | |
| 8,989,261 B2 | 3/2015 | Chong et al. | |
| 2001/0023454 A1 | 9/2001 | Fitzgerald | |
| 2002/0150166 A1* | 10/2002 | Johnson | H04N 19/80 |
| | | | 375/E7.193 |
| 2003/0026495 A1 | 2/2003 | Gondek et al. | |
| 2003/0117585 A1 | 6/2003 | Lee | |
| 2003/0169931 A1 | 9/2003 | Lainema | |
| 2003/0190086 A1 | 10/2003 | Kim | |
| 2004/0125113 A1* | 7/2004 | Kempf | H04N 19/527 |
| | | | 375/E7.193 |
| 2004/0161035 A1 | 8/2004 | Wedi | |
| 2004/0179610 A1 | 9/2004 | Lu et al. | |
| 2004/0179743 A1* | 9/2004 | Shibata | H04N 19/124 |
| | | | 375/E7.193 |
| 2005/0013363 A1 | 1/2005 | Cho et al. | |
| 2005/0013559 A1 | 1/2005 | Amorim et al. | |
| 2005/0053288 A1 | 3/2005 | Srinivasan et al. | |
| 2005/0117807 A1* | 6/2005 | Shohdohji | G06T 5/002 |
| | | | 375/E7.193 |
| 2005/0135699 A1 | 6/2005 | Anderson et al. | |
| 2005/0190292 A1 | 9/2005 | Yu et al. | |
| 2005/0200733 A1 | 9/2005 | Malvar et al. | |
| 2006/0028562 A1 | 2/2006 | Schmitz et al. | |
| 2006/0095612 A1 | 5/2006 | Fitzgerald | |
| 2006/0110056 A1 | 5/2006 | Gambhire | |
| 2006/0193529 A1 | 8/2006 | Boon et al. | |
| 2006/0262854 A1 | 11/2006 | Lelescu et al. | |
| 2006/0268990 A1 | 11/2006 | Lin et al. | |
| 2006/0285597 A1 | 12/2006 | Gupta et al. | |
| 2006/0288065 A1 | 12/2006 | Lelescu | |
| 2006/0294171 A1 | 12/2006 | Bossen et al. | |
| 2007/0053373 A1 | 3/2007 | Fitzgerald et al. | |
| 2007/0064798 A1 | 3/2007 | Paniconi et al. | |
| 2007/0140574 A1 | 6/2007 | Yamaguchi et al. | |
| 2007/0165282 A1 | 7/2007 | Sambongi et al. | |
| 2007/0172153 A1 | 7/2007 | Song | |
| 2007/0230565 A1 | 10/2007 | Tourapis et al. | |
| 2008/0002902 A1 | 1/2008 | Lin et al. | |
| 2008/0019605 A1 | 1/2008 | Yea et al. | |
| 2008/0024513 A1 | 1/2008 | Raveendran | |
| 2008/0063085 A1 | 3/2008 | Wu et al. | |
| 2008/0159649 A1* | 7/2008 | Kempf | H04N 19/176 |
| | | | 382/266 |
| 2008/0240559 A1 | 10/2008 | Malvar | |
| 2009/0010539 A1 | 1/2009 | Guarnera et al. | |
| 2009/0022220 A1 | 1/2009 | Vatis et al. | |
| 2009/0028459 A1 | 1/2009 | Frishman et al. | |
| 2009/0086816 A1 | 4/2009 | Leontaris et al. | |
| 2009/0257668 A1 | 10/2009 | Ye et al. | |
| 2009/0290637 A1 | 11/2009 | Lai et al. | |
| 2010/0008430 A1 | 1/2010 | Karczewicz et al. | |
| 2010/0014763 A1 | 1/2010 | Wittmann et al. | |
| 2010/0023336 A1 | 1/2010 | Shmunk | |
| 2010/0053415 A1 | 3/2010 | Yun | |
| 2010/0092100 A1 | 4/2010 | Madnani | |
| 2010/0104027 A1 | 4/2010 | Youn et al. | |
| 2010/0142844 A1 | 6/2010 | Pereira et al. | |
| 2010/0177822 A1 | 7/2010 | Karczewicz et al. | |
| 2010/0220788 A1 | 9/2010 | Wittmann et al. | |
| 2010/0272191 A1 | 10/2010 | Dorea et al. | |
| 2010/0284458 A1 | 11/2010 | Andersson et al. | |
| 2010/0284461 A1 | 11/2010 | Andersson et al. | |
| 2011/0026599 A1 | 2/2011 | Andersson et al. | |
| 2011/0274158 A1 | 11/2011 | Fu et al. | |
| 2015/0117554 A1 | 4/2015 | Chong et al. | |
| 2015/0117555 A1 | 4/2015 | Chong et al. | |

FOREIGN PATENT DOCUMENTS

| | | | | |
|---|---|---|---|---|
| CN | 101208957 A | | 6/2008 | |
| EP | 1033883 A1 | | 9/2000 | |
| EP | 1408697 A1 | | 4/2004 | |
| EP | 1432249 A1 | | 6/2004 | |
| EP | 1499134 A1 | | 1/2005 | |
| EP | 1513349 A2 | | 3/2005 | |
| EP | 1603338 A1 | | 12/2005 | |
| EP | 1744279 A1 * | | 1/2007 | G06K 9/40 |
| EP | 2262267 A1 | | 12/2010 | |
| JP | 61002482 A | | 1/1986 | |
| JP | 2004343334 A * | | 12/2004 | |
| JP | 2005501442 A | | 1/2005 | |
| JP | 2005514872 A | | 5/2005 | |
| JP | 2007506361 A | | 3/2007 | |
| JP | 2010514246 A | | 4/2010 | |
| RU | 2295203 C2 | | 3/2007 | |
| RU | 2302707 C2 | | 7/2007 | |
| TW | 201034467 A | | 9/2010 | |
| WO | 0154415 A1 | | 7/2001 | |
| WO | 03058945 A2 | | 7/2003 | |
| WO | WO-03094529 A2 | | 11/2003 | |
| WO | 2005034517 A1 | | 4/2005 | |
| WO | 2006012384 | | 2/2006 | |
| WO | 2006108654 A2 | | 10/2006 | |
| WO | 2007111292 A1 | | 10/2007 | |
| WO | WO-2007117240 A1 | | 10/2007 | |
| WO | 2008010929 A2 | | 1/2008 | |
| WO | 2008038238 A2 | | 4/2008 | |
| WO | 2008075247 A1 | | 6/2008 | |
| WO | 2008084378 A2 | | 7/2008 | |
| WO | 2008148272 | | 12/2008 | |

(56) References Cited

FOREIGN PATENT DOCUMENTS

WO          2010083438 A2     7/2010
WO          2011126759 A1    10/2011

OTHER PUBLICATIONS

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.

Bross B., et al., "High Efficiency Video Coding (HEVC) text specification draft 8", 10. JCT-VC Meeting; 101. MPEG Meeting; Nov. 7, 2012-Jul. 20, 2012; Stockholm; (Joint Collaborative Team On Video Coding of ISO/IEC JTC1/SC29/WG11 and ITU-TSG.16); URL: http://wftp3.itu.int/av-arch/jctvc-site/,, No. JCTVC-J1003_d7, Jul. 23, 2012 (Jul. 23, 2012), XP030112947, 260 Pages.

Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012, 290 pp.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland Nov. 2011), 214 pages.

Chen C. Y., et al.," CE8 Subset2: A Joint Proposal on Improving the Adaptive Loop Filter in TMuC0.9 by MediaTek, Qualcomm, and Toshiba", 4. JCT-VC Meeting; 95. MPEG Meeting; Jan. 20, 2011-Jan. 28, 2011; Daegu; (Joint Collaborative Team On Video Coding of ISO/IECJTC1/SC29/WG11 and ITU-TSG.16); URL: http://wftp3.itu.int/av-arch/jctvc-site/,, No. JCTVC-D119, Jan. 15, 2011 (Jan. 15, 2011), pp. 1-18, ISSN: 0000-0015 p. 2, paragraph 2-paragraph 2.1; figure 1 page 7 page 9 page 11, paragraph 2.6; table 1.

Chong I. S., et al., "CE8 Subtest 2: Block based adaptive loop filter (ALF)," Joint Collaborative Team on Video Coding (JCT-VC) of ITU-T SG16 WP3 and ISO/IEC JTC1/SC29/WG11, 5th Meeting: Geneva, CH, Mar. 2011, JCTVC-E323_r3, pp. 1-5.

Chujoh, et al., "Quadtree-Based Adaptive Loop Filter", ITU-T SG16 Contribution, COM 16-C181, Geneva, Jan. 2009, 4 pp.

Chujoh T., et al., "Specification and experimental results of quadtree-based adaptive loop filter", 37. VCEG meeting, Apr. 15, 2009 (Apr. 15, 2009), XP002675788, Yokohama Retrieved from the Internet: URL:http://wftp3.itu.int/av-arch/video-site/0904_Yok/VCEG-AK22.zip [retrieved on May 11, 2012], 11 pages.

Fu, et al., "CE8 Subset3: Picture Quadtree Adaptive Offset (PQAO),"Document of Joint Collaborative Team on Video Coding, JCTVC-D122, Jan. 2011, 10 pages.

Gonzalez, R.C., et al., "Digital Image Processing, Chapter 10: Image Segmentation", Jan. 1, 2008 (Jan. 2008), Digital Image Processing, Pearson Education, Inc, New Jersey, pp. 719-727, XP002669229, ISBN: 978-0-13-505267-9.

Gonzalez, R.C., et al., "Digital Image processing", Digital Image Processing, XX, XX, Jan. 1, 1992 (Jan. 1, 1992), pp. 189-201, XP002955339.

Gonzalez, R.C., et al., "Digital Image Processing, Image Enhancement in the Spatial Domain", Jan. 1, 2002 (2002-01-01 ), Digital Image Processing, Prentice-Hall, Upper Saddle River, New Jersey, pp. 128-134, XP001152050, Isbn: 978-0-201-18075-6.

Ikai et al., "CE8.2: Region-Based Adaptive Loop Filter using Two-Dimensional Feature", Joint Collaborative Team on Video Coding (JCT-VC) of ITU-T SG16 WP3 and ISO/IEC JTC1/SC29/WG11, 5th Meeting: Geneva, Switzerland, Mar. 2011, JCTVC-E141, pp. 1-7.

Ikai, et al., "Region-based adaptive loop filter using two-dimensional feature", Joint Collaborative Team on Video Coding (JCT-VC) of ITU-T SG16 WP3 and ISO/IEC JTC1/SC29/WG11, Document JCTVC-D116, 4th Meeting: Daegu, KR, Jan. 20-18, 2011, pp. 1-12.

Ikai T., et al., "CE8.1:Block based Adaptive Loop Filter with flexible syntax and additional BA mode by Sharp and Qualcomm," Joint Collaborative Team on Video Coding (JCT-VC) of ITU-T SG16 WP3 and ISO/IEC JTC1/SC29/WG11, 6th Meeting: Torino, IT, Jul. 2011, JCTVC-F384r2, pp. 1-6.

International Search Report & Written Opinion—PCT/US2009/050237, International Search Authority—European Patent Office—dated Nov. 10, 2009.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

ITU-T H.265, Series H: Audiovisual and Multimedia Systems, Infrastructure of audiovisual services—Coding of moving video, High efficiency video coding, The International Telecommunication Union, Oct. 2014, 540 pp.

Jahne B., Digital Image Processing, Springer-Verlag Berlin Heidelberg, 2005, 6th Edition.

Jahne, B., "Digital image processing," Technosphera, Moscow, 2007, pp. 331-338 (English version: 6th edition of B. Jahne, Digital image processing, Springer-Verlag Berlin Heidelberg, 2005, pp. 331-338).

Karczewicz M., et al., "Adaptive Filter Based on Combination of Sum-Modified Laplacian Filter Indexing and Quadtree Partitioning", 38. VCEG Meeting; 89, MPEG Meeting; Jan. 7, 2009-Aug. 7, 2009; London,Geneva; (Video Coding Experts Group of ITU-T SG.16), No. VCEG-AL27, Jul. 3, 2009 (Jul. 3, 2009), XP030003708, ISSN: 0000-0084 p. 1.

Karczewicz M., et al., "Post-filter applicability to intra coding" 33. VCEG Meeting; 83. MPEG Meeting; Dec. 1, 2008-Jan. 13, 2008; Antalya; (Video Coding Experts Group of ITU-T SG.16), No. VCEG-AH26, Jan. 9, 2008 (Jan. 9, 2008), XP030003564 the whole document.

Karczewicz M, et al., "Post-filter hint SEI message extensions" 35. VCEG Meeting; 85. MPEG Meeting; Jul. 16, 2008-Jul. 18, 2008; Berlin; (Video Coding Experts Group of ITU-T SG.16), Jul. 12, 2008 (Jul. 12, 2008), XP030003599.

Karczewicz M., et al., "Video coding technology proposal by Qualcomm", 1. JCT-VC Meeting; Apr. 15, 2010-Apr. 23, 2010; Dresden; (Joint Collaborative Team On Video Coding of ISO/IEC JTC1/SC29/WG11 and TU-TSG.16); URL: http://wftp3.itu.int/av-arch/jctvc-site/, No. XP030007566, May 18, 2010 (May 18, 2010), pp. 1-24, XP030007567, ISSN: 0000-0049 p. 1 p. 12-p. 13.

Karczewicz M., et al., "Video Coding Technology Proposal by Qualcomm Inc.," JCTVC-A121, Joint Collaborative Team on Video Coding(JCT-VC) of ITU-T SG16 WP3 and ISO/IEC JTC1/SC29/WG11, 1st Meeting: Dresden, DE, Apr. 15-23, 2010, 2 pages.

Kawamura K. et al., "Adaptive loop filtering using directional activity", JCTVC-E190, KDDI Corp., Mar. 2011, pp. 1-3.

Lai, et al., "CE8 Subtest 1: Block-based filter adaptation with features on subset of pixels," Joint Collaborative Team an Video (56) References Cited

OTHER PUBLICATIONS

Coding (JCT-VC) of ITU-T SG16 WP3 and ISO/IEC JTC1/SC29/WG11, 6th Meeting: Torino, Italy, Jul. 14-22, 2011, Document JCTVC-F301.
Lai, et al., "Loop filter with directional similarity mapping (DSM)", Joint Collaborative Team on Video Coding (JCT-VC) of ITU-T SG16 WP3 and ISO/IEC JTC1/SC29/WG11, Document JCTVC-D221,4th Meeing: Daegu, KR, Jan. 20-28, 2011, pp. 1-8.
Lee J-S., "Refined Filtering of Image Noise Using Local Statistics", Computer Graphics and Image Processing, vol. 15, No. 4, Apr. 1981, pp. 380-389.
List P., et al.,"Adaptive deblocking filter", IEEE Transactions on Circuits and Systems for Video Technology, IEEE Service Center, Piscataway, NJ, US, vol. 13, No. 7, Jul. 1, 2003, pp. 614-619, XP011221094.
McCann K., et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.
Shin S.H.,et al., "Variable Block-Based Deblocking Filter for H.264/AVC on Low-end and Low-bit Rates Terminals", Signal Processing: Image Communication, vol. 25, Issue 4, Apr. 2010, pp. 255-267.
Taiwan Search Report—TW098123557—TIPO—dated Oct. 22, 2012.
Tsai C. Y., et al., "TE10 subtest 2: Coding unit synchronous picture quadtree-based adaptive loop filter (QALF)", 94. MPEG Meeting; Nov. 10, 2010-Oct. 15, 2010; Guangzhou; (Motion Picture Expert Group or ISO/ECJTC1/SC29/WG11),, No. M18169, Oct. 28, 2010 (Oct. 28, 2010), XP030046759, p. 1 p. 2, paragraph 2.1-p. 4, paragraph 2.2 p. 7; table 2.
U.S. Appl. No. 13/401,548, by In Suk Chong, filed Feb. 21, 2012.
U.S. Appl. No. 13/401,552, by In Suk Chong, filed Feb. 21, 2012.
U.S. Appl. No. 13/401,573, by In Suk Chong, filed Feb. 21, 2012.
U.S. Appl. No. 13/401,685, by In Suk Chong, filed Feb. 21, 2012.
Vatis Y., et al., "Coding of Coefficients of Two-Dimensional Non-Separable Adaptive Wiener Interpolation Filter", Proceeding of the SPIE—The International Society for Optical Engineering, SPIE, PO Box 10 Bellingham WA 98227-0010 USA, vol. 5960, Jul. 12, 2005, pp. 623-631, XP002419200, DOI: 10.1117/12.632494, ISBN: 978-1-62841-730-2.
Vatis Y et al: "Motion-And Aliasing-Compensated Prediction Using a Two-Dimensional Non-Separable Adaptive Wiener Interpolation Filter" Image Processing, 2005. ICIP 2005. IEEE International Conference On Genova, Italy Sep. 11-14, 2005, Piscataway, NJ, USA, IEEE, vol. 2, Sep. 11, 2005 (Sep. 11, 2005 ), pp. 894-897, XP010851198 ISBN: 978-0-7803-91 34-5.
Wedi T., "Adaptive Interpolation Filter for Motion Compensated Prediction", Proc. IEEE International Conference on Image Processing (ICIP), New York, vol. 2, Sep. 2002, pp. II-509-II-512.
Wiegand, T. et al.: "Overview of the H.264/AVC Video Coding Standard," IEEE Transactions on Circuits and Systems for Video Technology, vol. 13, No. 7, Jul. 2003, 19 pp, XP011099249, ISSN: 1051-8215.
Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.
Wiegand, T., et al., "WD3: Working Draft 3 of High-Efficiency Video Coding," Document JCTVC-E603, 5th Meeting: Geneva, CH, Mar. 16-23, 2011, 160 pages.
Wiegand T., et al.,"WD1: Working Draft 1 of High-Efficiency Video Coding", JCTVC-C403, Joint Collaborative Team an Video Coding (JCT-VC), of ITU-T SG16 WP3 and ISO/IEC JTC1/SC29/WG11, 3rd Meeting: Guangzhou, CN, Oct. 7-15, 2010, 137 pp.
Wittmann S., et al., "Transmission of Post-Filter Hints for Video Coding Schemes", IEEE International Conference on Image Processing, Sep. 16, 2007-Oct. 19, 2007, 4 pages.
Yamakage T., et al., "Tool Experiment 10: In-loop Filtering". Joint Collaborative Team on Video Coding (JCT-VC) of ITU-T SG16 WP3 and ISO/IEC JTC1/SC29/WG11, 2nd Meeting: Geneva, CH, Jul. 21-28, 2010, URL: http://wftp3.itu.int/av-arch/jctvc-site/, Document: JCTVC-B310, 14 pages.

\* cited by examiner

FILTERING VIDEO DATA USING A PLURALITY OF FILTERS

I. CLAIM OF PRIORITY

This application is a continuation of U.S. patent application Ser. No. 12/406,585, filed Mar. 18, 2009, which claims priority from U.S. Provisional Patent Application No. 61/079,998 filed Jul. 11, 2008, and U.S. Provisional Patent Application No. 61/094,011 filed Sep. 3, 2008, all of which are incorporated herein by reference in their entirety and for all purposes.

II. FIELD OF THE DISCLOSURE

The present disclosure is generally directed to a system and method to filter video data using a plurality of filters.

III. BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras, or that display image or video data captured by a digital camera. Such processing devices can be utilized to provide video and audio functions, to process received data such as image data, or to perform other functions.

One type of video processing involves filtering, which may be applied to enhance the quality of a decoded video signal. The filter can be applied as a post-filter, where the filtered frame is not used for prediction of future frames, or as an in-loop filter, where the filtered frame is used to predict future frames. A filter may be designed by reducing an error between the original signal and the decoded filtered signal. Similarly, to transform coefficients, the coefficients of the resulting filter may be quantized, coded, and sent to the video decoder. More precise quantized filter coefficients may enable better performance. However, as precision of quantized filter coefficients increases, a number of bits required to transmit the coefficients may also increase, with a corresponding impact on network resources, data delivery rates, or both.

IV. SUMMARY

Multiple filters may be determined at a video encoder and provided to a receiver via a video data stream. The receiver may extract information from the data stream to identify which of the multiple filters to apply to a particular frame, a particular macroblock, a particular pixel, or any combination thereof. The multiple filters may be used for post-processing filtering or for filtering within a processing loop at a decoder.

In a particular embodiment, a method is disclosed that includes receiving and decoding a plurality of filters embedded in a video data bitstream at a video decoder. The method includes selecting, based on information included in the video data bitstream, a particular filter of the plurality of filters. The method further includes applying the particular filter to at least a portion of decoded video data of the video data bitstream to produce filtered decoded video data.

In another embodiment, an apparatus is disclosed that includes a video decoder configured to receive and decode a plurality of filters embedded in a video data bitstream. The apparatus also includes a processor configured to select, based on information included in the video data bitstream, a particular filter of the plurality of filters and to apply the particular filter to at least a portion of decoded video data of the video data bitstream to produce filtered decoded video data.

In another embodiment, an integrated circuit is disclosed that includes video decoding circuitry configured to receive and decode a signal including a plurality of filters embedded in a video data bitstream. The integrated circuit also includes processing circuitry configured to process the decoded signal to select, based on information included in the video data bitstream, a particular filter of the plurality of filters and to apply the particular filter to at least a portion of decoded video data of the video data bitstream to produce filtered decoded video data.

In another embodiment, an apparatus is disclosed that includes means for decoding a plurality of filters embedded in a video data bitstream. The apparatus includes means for selecting, based on information included in the video data bitstream, a particular filter of the plurality of filters. The apparatus further includes means for applying the particular filter to at least a portion of decoded video data of the video data bitstream to produce filtered decoded video data.

In another embodiment, a computer-readable medium storing computer executable code is disclosed. The computer-readable medium includes code for receiving and decoding a plurality of filters embedded in a video data bitstream at a video decoder. The computer-readable medium includes code for selecting, based on information included in the video data bitstream, a particular filter of the plurality of filters. The computer-readable medium further includes code for applying the particular filter to at least a portion of decoded video data of the video data bitstream to produce filtered decoded video data.

One particular advantage provided by disclosed embodiments is an improvement in the performance of filtering, particularly in the performance of post-filtering in order to enhance the quality of a decoded video signal. Another particular advantage provided by disclosed embodiments is a reduced number of bits required to transmit filter coefficients of a plurality of filters.

Other aspects, advantages, and features of the present disclosure will become apparent after review of the entire application, including the following sections: Brief Description of the Drawings, Detailed Description, and the Claims.

VI. DETAILED DESCRIPTION

Figure 1:
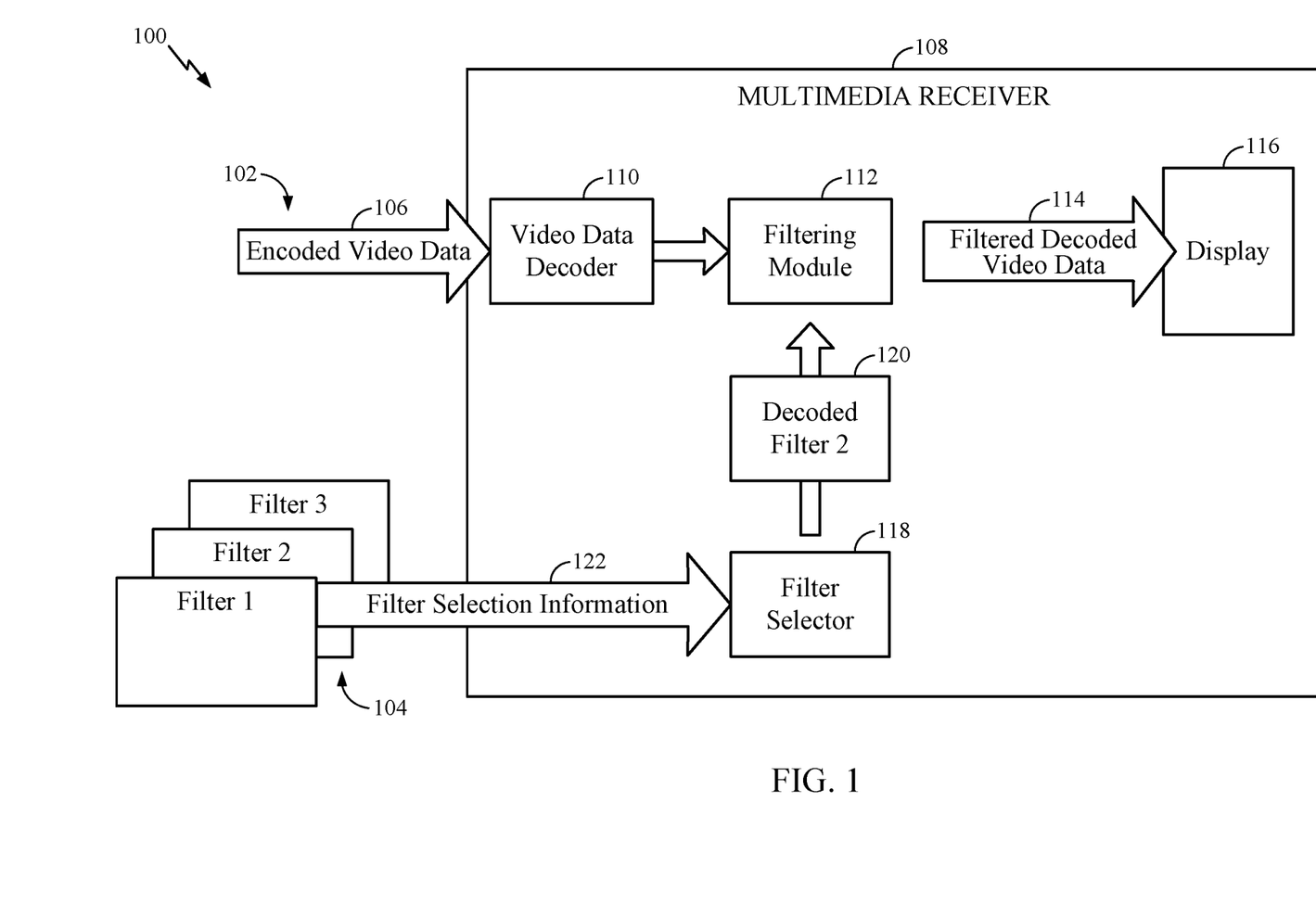
FIG. 1 is a block diagram of a particular illustrative embodiment of a video data processing system that includes a video data bitstream and a multimedia receiver.

Referring to FIG. 1, a particular embodiment of a video data processing system 100 is illustrated. The video data processing system 100 includes a video data bitstream 102 received by a multimedia receiver 108. The video data bitstream 102 includes encoded video data 106, a plurality of filters 104, and filter selection information 122. The multimedia receiver 108 includes a video data decoder 110, a filtering module 112, a filter selector 118, and a display 116. The system 100 enables the multimedia receiver 108 to select a filter from the video data bitstream 102 based on the filter selection information 122.

The video data decoder 110 is configured to decode the encoded video data 106. For example, the video data decoder 110 may be configured to decode entropy encoded data and to perform an inverse discrete cosine transform (DCT) on the resulting data. In a particular embodiment, the video data decoder 110 includes a H.264 or Moving Pictures Expert Group (MPEG) compatible decoder.

The filtering module 112 is configured to receive a filter from the filter selector 118, such as the second decoded filter 120. The filtering module 112 is configured to apply the received filter 120 to decoded video data received from the video data decoder 110. The filtering module 112 may be configured to apply the filter to the decoded video data on a frame, macroblock, or pixel granularity, to produce filtered decoded video data 114 that is provided to the display 116. The filtering module 112 may be implemented within a decoding loop (not shown), or for post-processing filtering, or any combination thereof.

The filter selector 118 is configured to receive the filter selection information 122 and to select appropriate filters from the plurality of filters 104. In a particular embodiment, the filter selector 118 is adapted to decode the plurality of filters 104 and to provide selected decoded filters, such as the second decoded filter 120, to the filtering module 112. The filter selector 118 may select decoded filters to provide to the filtering module 112 based on the filter selection information 122. In a particular embodiment, the filter selector 118 compares one or more characteristics of the decoded video data that is generated by the video data decoder 110 to the filter selection information 122 to select an appropriate filter for the particular video data that is provided to the filtering module 112.

During operation, the encoded video data 106 is received and decoded by the video data decoder 110 of the multimedia receiver 108. The plurality of filters 104 and the filter selection information 122 are received and decoded at the filter selector 118 of the multimedia receiver 108. The filter selector 118 selects a particular decoded filter 120 of the plurality of filters 104 based on the filter selection information 122 included in the video data bitstream 102. The particular decoded filter 120 is applied to at least a portion of the decoded video data at the filtering module 112 of the multimedia receiver 108, producing the filtered decoded video data 114. The filtered decoded video data 114 is displayed at the display 116 of the multimedia receiver 108.

By receiving multiple filters with the encoded video data 106, the multimedia receiver 108 can select particular filters that result in a lowest error of each unit of decoded video data. For example, a filter can be selected that provides a lowest mean square error for a particular frame of video data, on a frame-by-frame basis. As another example, a filter can be selected that provides a lowest error for a particular macroblock at a macroblock-by-macroblock basis, or at a pixel-by-pixel basis. The video data processing system 100 may therefore provide an improvement in the performance of filtering, particularly in the performance of post-filtering in order to enhance the quality of a decoded video signal. In addition, by encoding the filter coefficients and in some embodiments, using coefficients of some filters to predict coefficients of later filters, the video data processing system 100 further provides a reduction in the number of bits required to transmit filter coefficients of each filter of the plurality of filters 104.

Figure 2:
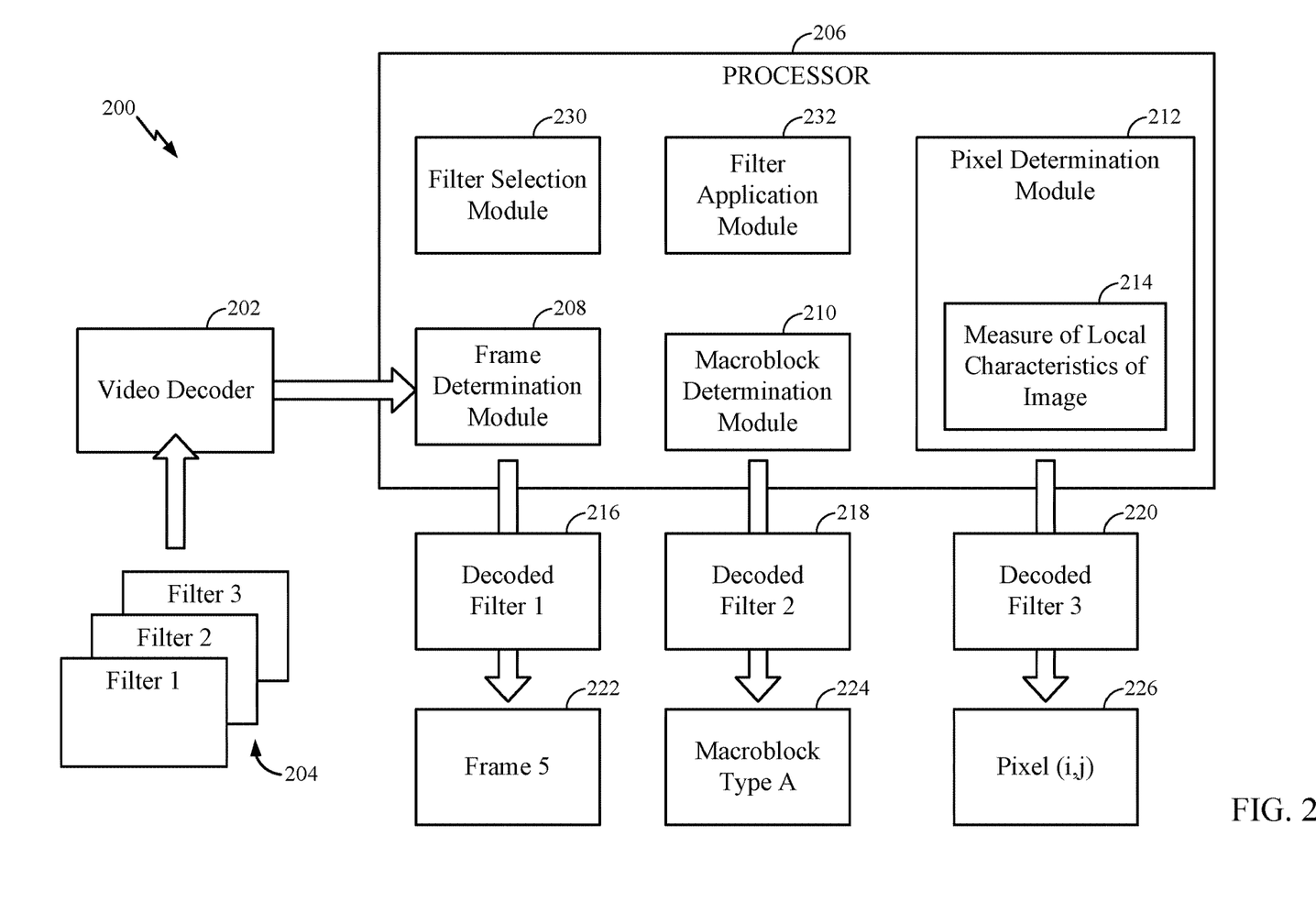
FIG. 2 is a block diagram of a particular illustrative embodiment of a video data processing apparatus that includes a video decoder and a processor.

Referring to FIG. 2, a particular embodiment of a video data processing apparatus 200 is illustrated. The video data processing apparatus 200 includes a video decoder 202 and a processor 206. The video decoder 202 is configured to receive and decode a plurality of filters 204 embedded in a video data bitstream. In a particular embodiment, at least a portion of video data in the video data bitstream is encoded using MPEG encoding. The processor 206 includes a frame determination module 208, a macroblock determination module 210, a pixel determination module 212, a filter selection module 230, and a filter application module 232. In an illustrative embodiment, the video decoder 202 is the video data decoder 102 of FIG. 2, and the plurality of filters 204 is embedded in a video data bitstream in a similar manner as the plurality of filters 104 of FIG. 1 embedded in the video data bitstream 102.

In a particular embodiment, the filter selection module 230 is executable by the processor 206 to select a particular filter of the plurality of filters 204 based on information included in the video data bitstream. In a particular embodiment, the information included in the video data bitstream is similar to the filter selection information 122 of FIG. 1 included in the video data bitstream 102.

In a particular embodiment, the filter application module 232 is executable by the processor 206 to apply the particular filter selected by the filter selection module 230 to at least a portion of decoded video data of the video data bitstream to produce filtered decoded video data. In a particular embodiment, the filtered decoded video data produced is similar to the filtered decoded video data 114 of FIG. 1.

In a particular embodiment, the frame determination module 208 is executable by the processor 206 to determine frames of the video data for which each filter of the plurality of filters 204 is to be applied, where the information included in the video data bitstream identifies frames corresponding to each filter by at least one of a frame number or a frame type. In a particular embodiment, the frame types can include an intra-coded pictures frame (I-frame) type, a predictive pictures frame (P-frame) type, or a bi-predictive pictures frame (B-frame) type. For example, the frame determination module 208 may determine a frame number of each frame and provide the determined frame number to the filter selection module 230. To illustrate, the frame determination module 208 may determine that a particular frame 222 being processed has a frame number "5," in response to which the filter selection module 230 selects a first decoded filter 216 to be applied to the decoded frame with number "5" 222. Different ways may be used to indicate which filters are to be used and which filters are to be combined. For example, it could be signaled to the decoder that for B-frame types, filters $f_1$, $f_2$, and $f_3$ should be used.

In a particular embodiment, the macroblock determination module 210 is executable by the processor 206 to determine macroblocks for which each filter of the plurality of filters 204 is to be applied. The information included in the video data bitstream may identify macroblocks corresponding to each filter by at least one of a listing of macroblock types (e.g., intra-frame, inter frame, bi-directional inter frame) or a range of quantization parameter values used to reconstruct the macroblocks, as illustrative, non-limiting examples. For example, the macroblock determination module 210 may determine a type of each macroblock and provide the determined macroblock type to the filter selection module 230. To illustrate, the macroblock determination module 210 may determine that a particular macroblock 224 being processed has a type "A" (e.g., an intra-frame type), in response to which the filter selection module 230 selects a second decoded filter 218 to be applied to the particular macroblock 224.

In a particular embodiment, the pixel determination module 212 is executable by the processor 206 to determine pixels to which each filter of the plurality of filters 204 is to be applied based on a predetermined measure of local characteristics of an image 214. The pixel determination module 212 may generate a value of the predetermined measure 214 for a particular pixel(i,j) 226 being processed at a row i and column j of a macroblock or a frame of the decoded video signal, in response to which the filter selection module 230 selects a third decoded filter 220 to be applied to the pixel (i,j) 226.

In a particular embodiment, the predetermined measure of local characteristics of the image 214 includes a variance value of a pixel from a mean value of the reconstructed image. For example, for the reconstructed image R(i, j) where i=0, . . . , M and j=0, . . . , N, the mean value ⟨R(i, j)⟩ may be defined such that $$\langle R(i, j) \rangle = \frac{\sum_{k=-K}^{K} \sum_{l=-L}^{L} R(i+k, j+l)}{(2K+1)(2L+1)}.$$

The variance value var(i, j) of the reconstructed pixel(i,j) from the mean value ⟨(R(i,j))⟩ may be defined such that var $$(i, j) = \frac{\sum_{k=-K}^{K} \sum_{l=-L}^{L} (R(i+k, j+l) - \langle R(i, j) \rangle)^2}{(2K+1)(2L+1)}.$$

In a particular embodiment, the predetermined measure of local characteristics of the image 214 includes absolute values of differences within a reconstructed image. For example, for the reconstructed pixel(i,j) where i=0, . . . , M and j=0, . . . , N, the absolute value of differences abs(i, j) may be defined such that $$\mathrm{abs}(i, j) = \frac{\sum_{k=-K}^{K} \sum_{l=-L}^{L} |R(i+k, j+l) - R(i, j)|}{(2K+1)(2L+1)}.$$

In a particular embodiment, the predetermined measure of local characteristics of the image 214 includes gradient values within a reconstructed image. For example, a gradient of image values at a pixel of interest may be determined as the predetermined measure of local characteristics of the image 214. In another embodiment, the predetermined measure of local characteristics of the image 214 includes sharpness measures within a reconstructed image.

In a particular embodiment, a first filter of the plurality of filters 204 is applied to first pixels having a first value of the predetermined measure of local characteristics of the image 214 in a first range of values and a second filter of the plurality of filters 204 is applied to second pixels having a second value of the predetermined measure of local characteristics of the image 214 in a second range of values. For example, the filters $f_m$ for m=0, . . . , n+1 may be applied such that the filter $f_0$ is applied to pixels (i, j) having a variance value var(i, j) that lies in the range $0 \le \mathrm{var}(i, j) < \mathrm{var}_0$, the filter $f_1$ is applied to pixels (i, j) having a variance value var (i, j) that lies in the range $\mathrm{var}_0 \le \mathrm{var}(i, j) < \mathrm{var}_1$, and, generally, the filter $f_r$ for r=1, . . . , n is applied to pixels (i, j) having a variance value var(i, j) that lies in the range $\mathrm{var}_{r-1} \le \mathrm{var}(i, j) < \mathrm{var}_r$, where the filter $f_{n+1}$ is applied to pixels (i, j) having a variance value var (i, j) that lies in the range $\mathrm{var}_n \le \mathrm{var}(i, j)$. In an alternative embodiment, the filters $f_1$ and $f_2$ may be applied such that the filter $f_1$ is applied to pixels (i, j) having a variance value var(i, j) that lies in the range $0 \le \mathrm{var}(i, j) < \mathrm{var}_0$, the filter $f_1$ is applied to pixels (i, j) having a variance value var (i, j) that lies in the range $\mathrm{var}_0 \le \mathrm{var}(i, j) < \mathrm{var}_1$, and the filter $f_2$ is applied otherwise.

In a particular embodiment, quantized filter coefficients of each of the filters of the plurality of filters 204 are clipped to be within a range of about 0 to about 2 raised to the nth power. The range of about 0 to about 2 raised to the nth power may be divided into a number of intervals m. The number of intervals m is determined at least partially based on indices of the quantized filter coefficients of each of the filters of the plurality of filters 204. For example, the quantized filter coefficients $f_r$ (k,l) for r=0, . . . , s+1, k=-K, . . . , K, and l=-L, . . . , L may be clipped to be within the range $0 \le f_r(k,l) \le 2^n$. The range $0 \le f_r(k,l) \le 2^n$ may be divided into a number of intervals m, where the number of intervals m is determined at least partially based on the indices (k,l) of the quantized filter coefficients $f_r(k,l)$ for r=0, . . . , s+1, k=-K, . . . , K, and l=-L, . . . , L. In a particular embodiment, a particular quantized filter coefficient is determined by decoding a variable length codeword indicating a particular interval of the number of intervals m that corresponds to a value of the particular quantized filter coefficient, and by decoding a fixed length codeword specifying the value of the particular quantized filter coefficient within the particular interval.

In a particular embodiment, first filter coefficients of a first filter of the plurality of filters 204 are used to predict second filter coefficients of a second filter of the plurality of filters 204. For example, if filters $f_m$ for m=0, . . . , n+1 correspond to different values of variance $\mathrm{var}_r$ for r=0, . . . , n, as described above, filter $f_1$ may be predicted from filter $f_0$, filter $f_2$ may be predicted from filter $f_1$, and, generally, filter $f_{s+1}$ may be predicted from filter $f_s$ for s=0, . . . , n.

One or more of the modules 208, 210, 212, 230, and 232 may be implemented as computer executable code including program instructions executing at the processor 206, as dedicated hardware circuits, as state machines, as field programmable gate arrays (FPGAs), or any combination thereof. The processor 206 may execute one or more of the frame determination module 208, the macroblock determination module 210, and the pixel determination module 212, to determine filters to be applied to the decoded video data. In a particular embodiment, the video data processing apparatus 200 may include other components not shown, such as a display device configured to display the filtered decoded video data, similar to the display 116 shown in FIG. 1.

Figure 3:
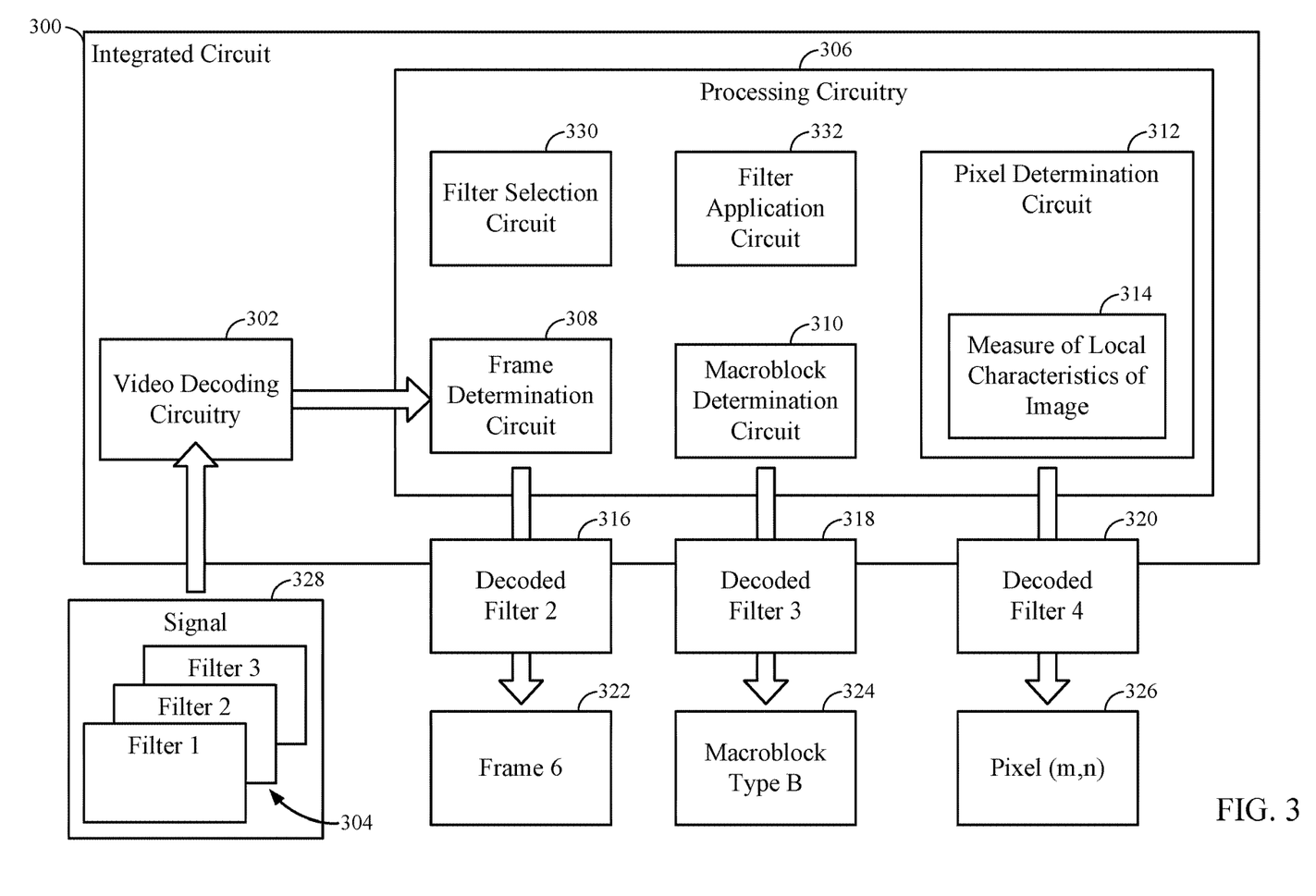
FIG. 3 is a block diagram of a particular illustrative embodiment of an integrated circuit that includes video decoding circuitry and processing circuitry.

Referring to FIG. 3, a video data processing integrated circuit 300 is illustrated. The video data processing integrated circuit 300 includes video decoding circuitry 302 and processing circuitry 306. The video decoding circuitry 302 is configured to receive and decode a signal 328 including a plurality of filters 304 embedded in a video data bitstream. In a particular embodiment, the plurality of filters 304 is embedded in a video data bitstream in a manner that is similar to the plurality of filters 104 of FIG. 1 embedded in the video data bitstream 102.

The processing circuitry 306 is configured to process the decoded signal 328 to select a particular filter of the plurality of filters 304 based on information included in the video data bitstream. In a particular embodiment, the information included in the video data bitstream is similar to the filter selection information 122 of FIG. 1 included in the video data bitstream 102. The processing circuitry 306 includes a frame determination circuit 308, a macroblock determination circuit 310, a pixel determination circuit 312, a filter selection circuit 330, and a filter application circuit 332. The processing circuitry 306 is configured to process the decoded signal from the video decoding circuitry 302 to apply a particular filter, such as a second decoded filter 316, a third decoded filter 318, or a fourth decoded filter 320, to at least a portion of decoded video data of the video data bitstream to produce filtered decoded video data. In a particular embodiment, the filtered decoded video data produced is similar to the filtered decoded video data 114 of FIG. 1.

In a particular embodiment, the frame determination circuit 308 is configured to determine frames for which each filter of the plurality of filters 304 is to be applied, where the information included in the video data bitstream identifies frames corresponding to each filter by at least one of a frame number or a frame type. For example, the frame determination circuit 308 may determine that a particular frame 322 has a frame number "6" and may provide the frame number to the filter selection circuit 330. The filter selection circuit 330 may select the second decoded filter 316 for the frame 322 based on the frame number and according to information received via the video data bitstream. The filter application circuit 332 may apply the second decoded filter 316 to the frame 322 with the frame number "6."

In a particular embodiment, the macroblock determination circuit 310 is configured to determine macroblocks for which each filter of the plurality of filters 304 is to be applied, where the information included in the video data bitstream identifies macroblocks corresponding to each filter by at least one of a listing of macroblock types or a range of quantization parameter values used to reconstruct the macroblocks. For example, the macroblock determination circuit 310 may determine that a particular macroblock 324 has a type "B" (e.g., a bi-directional inter frame type) and may provide the macroblock type to the filter selection circuit 330. The filter selection circuit 330 may select the third decoded filter 318 for the particular macroblock 324 based on the macroblock type and according to information received via the video data bitstream. The filter application circuit 332 may apply the third decoded filter 318 to the particular macroblock 324 with the type "B."

In a particular embodiment, the pixel determination circuit 312 is configured to process the decoded signal to determine pixels for which each filter of the plurality of filters 304 is to be applied based on a predetermined measure of local characteristics of an image 314. For example, the pixel determination circuit 312 may determine a value of the predetermined measure of local characteristics of the image 314 corresponding to a particular pixel(m,n) 326 at a row m and a column n, and may provide the value of the predetermined measure of local characteristics of the image 314 to the filter selection circuit 330. The filter selection circuit 330 may select the fourth decoded filter 320 for the pixel (m,n) 326 based on the value of the predetermined measure of local characteristics of the image 314 and according to information received via the video data bitstream. The filter application circuit 332 may apply the fourth decoded filter 320 to the pixel(m,n) 326. In a particular embodiment, the predetermined measure of local characteristics of the image 314 is determined in a substantially similar manner as the predetermined measure of local characteristics of the image 214 of FIG. 2, such as using a variance or a gradient, as illustrative, non-limiting examples.

In a particular embodiment, an apparatus includes means for decoding a plurality of filters embedded in a video data bitstream. The means for decoding a plurality of filters embedded in a video data bitstream may include a video decoder, such as the video decoder 202 shown in FIG. 2, video decoding circuitry, such as the video decoding circuitry 302 shown in FIG. 3, corresponding hardware, software, firmware, or any combination thereof. The apparatus includes means for selecting, based on information included in the video data bitstream, a particular filter of the plurality of filters. The means for selecting a particular filter of the plurality of filters may include a processor, such as the processor 206 shown in FIG. 2, processing circuitry, such as the processing circuitry 306 shown in FIG. 3, corresponding hardware, software, firmware, or any combination thereof. The apparatus further includes means for applying the particular filter to at least a portion of decoded video data of the video data bitstream to produce filtered decoded video data. The means for applying the particular filter may include a processor, such as the processor 206 shown in FIG. 2, processing circuitry, such as the processing circuitry 306 shown in FIG. 3, corresponding hardware, software, firmware, or any combination thereof.

In a particular embodiment, the apparatus includes means for determining frames for which each filter of the plurality of filters is to be applied, where the information included in the video data bitstream identifies frames corresponding to each filter by at least one of a frame number or a frame type. The means for determining frames may include a processor, such as the processor 206 shown in FIG. 2, processing circuitry, such as the processing circuitry 306 shown in FIG. 3, corresponding hardware, software, firmware, or any combination thereof.

In a particular embodiment, the apparatus includes means for determining macroblocks for which each filter of the plurality of filters is to be applied, wherein the information included in the video data bitstream identifies macroblocks corresponding to each filter by at least one of a listing of macroblock types or a range of quantization parameter values used to reconstruct the macroblocks. The means for determining macroblocks may include a processor, such as the processor 206 shown in FIG. 2, processing circuitry, such as the processing circuitry 306 shown in FIG. 3, corresponding hardware, software, firmware, or any combination thereof.

In a particular embodiment, the apparatus includes means for determining pixels for which each filter of the plurality of filters is to be applied based on a predetermined measure of local characteristics of an image. The means for determining pixels may include a processor, such as the processor 206 shown in FIG. 2, processing circuitry, such as the processing circuitry 306 shown in FIG. 3, corresponding hardware, software, firmware, or any combination thereof.

Figure 5:
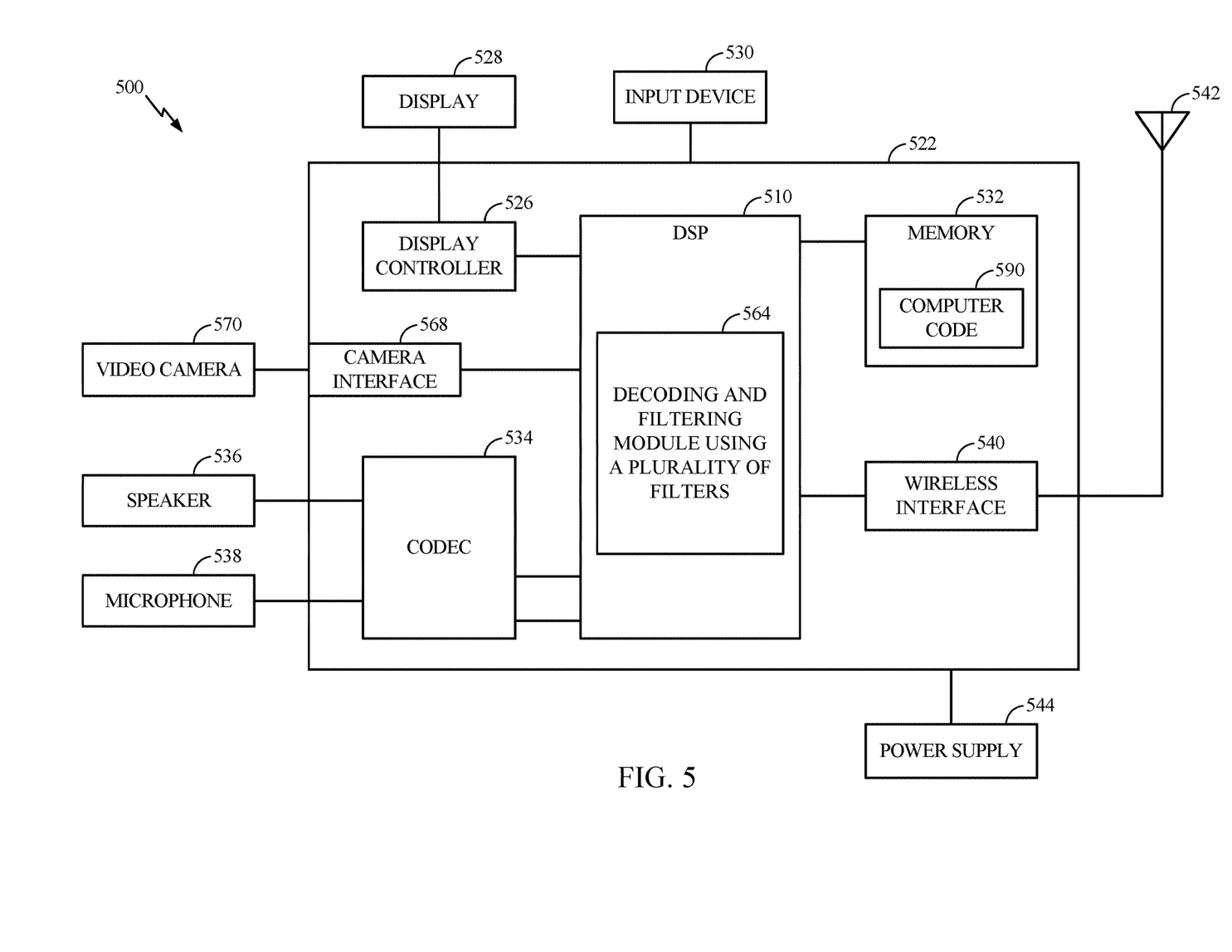
FIG. 5 is a block diagram of a particular embodiment of a portable communication device including a decoding and filtering module using a plurality of filters.

In a particular embodiment, the apparatus includes means for receiving the video data bitstream via a wireless transmission. The means for receiving the video data bitstream via a wireless transmission may include a wireless receiver, wireless receiving circuitry, a wireless transceiver, a portable communications device such as shown in FIG. 5 and described more fully below, corresponding hardware, software, firmware, or any combination thereof.

Figure 4:
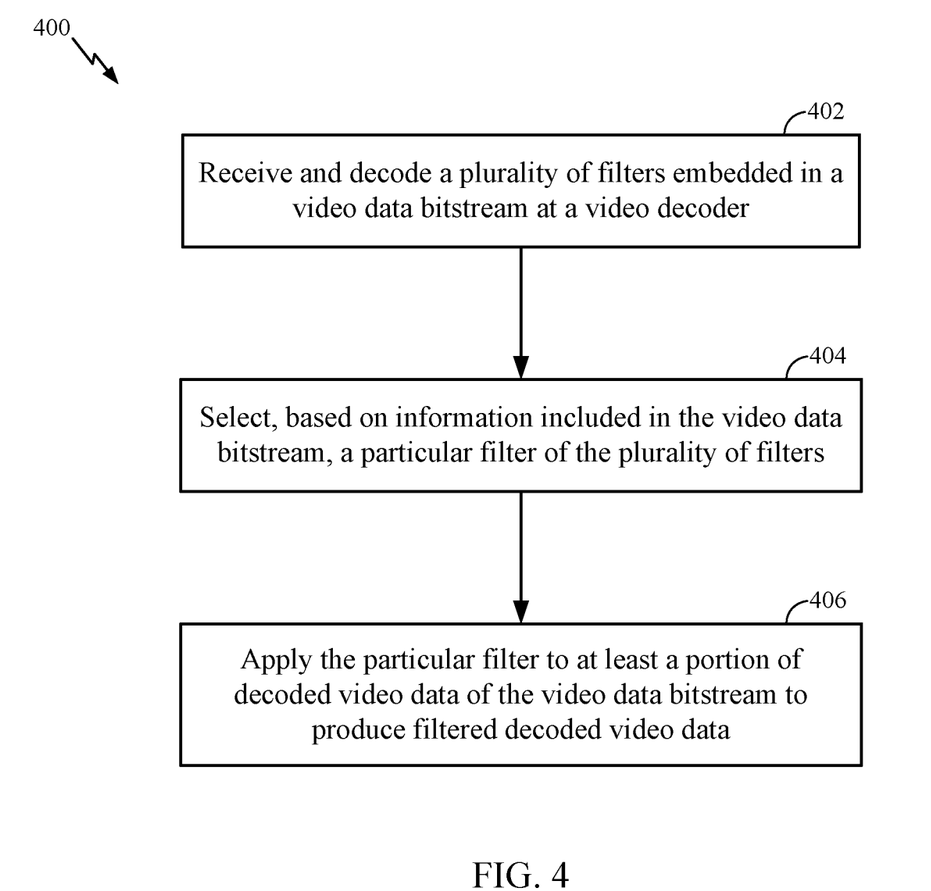
FIG. 4 is a flow diagram of a particular illustrative embodiment of a method to filter video data using a plurality of filters.

Referring to FIG. 4, a method 400 to filter video data using a plurality of filters is illustrated. The method 400 includes receiving and decoding a plurality of filters embedded in a video data bitstream at a video decoder, at 402. For example, the plurality of filters 204 of FIG. 2 may be embedded in a video data bitstream such as the video data bitstream 102 of FIG. 1. The plurality of filters 204 may be received and decoded at the video decoder 202 of FIG. 2.

The method 400 includes selecting, based on information included in the video data bitstream, a particular filter of the plurality of filters, at 404. For example, the processor 206 of FIG. 2 may select a particular filter of the plurality of filters 204, such as the first decoded filter 216, based on information included in the video data bitstream, such as the filter selection information 122 of FIG. 1 included in the video data bitstream 102.

The method 400 further includes applying the particular filter to at least a portion of decoded video data of the video data bitstream to produce filtered decoded video data, at 406. For example, the processor 206 of FIG. 2 may apply the decoded filter 216 to at least a portion of decoded video data, such as the particular frame 222, of the video data bitstream to produce filtered decoded video data, such as the filtered decoded video data 114 of FIG. 1.

FIG. 5 is a block diagram of particular embodiment of a system including a decoding and filtering module using a plurality of filters. The system 500 may be implemented in a portable electronic device and includes a processor 510, such as a digital signal processor (DSP), coupled to a memory 532. The system 500 includes a decoding and filtering module using a plurality of filters 564. In an illustrative example, the decoding and filtering module using a plurality of filters 564 includes any of the systems of FIGS. 1-3, operates in accordance with the method of FIG. 4, or any combination thereof. The decoding and filtering module using a plurality of filters 564 may be in the processor 510 or may be a separate device or circuitry along a hardware image processing pipeline (not shown), or a combination thereof.

A camera interface 568 is coupled to the processor 510 and also coupled to a camera, such as a video camera 570. The camera interface 568 may be responsive to the processor 510, such as for autofocusing and autoexposure control. A display controller 526 is coupled to the processor 510 and to a display device 528. A coder/decoder (CODEC) 534 can also be coupled to the processor 510. A speaker 536 and a microphone 538 can be coupled to the CODEC 534. A wireless interface 540 can be coupled to the processor 510 and to a wireless antenna 542.

The processor 510 may also be adapted to generate processed image data. The display controller 526 is configured to receive the processed image data and to provide the processed image data to the display device 528. In addition, the memory 532 may be configured to receive and to store the processed image data, and the wireless interface 540 may be configured to receive the processed image data for transmission via the antenna 542.

In a particular embodiment, the decoding and filtering module using a plurality of filters 564 is implemented as computer code that is running at the processor 510, such as computer executable instructions that are stored at a computer readable medium, illustrated as the computer code 590 stored at the memory 532. For example, the computer code 590 may include code for receiving and decoding a plurality of filters embedded in a video data bitstream at a video decoder, code for selecting, based on information included in the video data bitstream, a particular filter of the plurality of filters, and code for applying the particular filter to at least a portion of decoded video data of the video data bitstream to produce filtered decoded video data.

For example, the computer code 590 may also include code for determining frames for which each filter of the plurality of filters is to be applied, where the information included in the video data bitstream identifies frames corresponding to each filter by at least one of a frame number or a frame type. As another example, the computer code 590 may also include code for determining macroblocks for which each filter of the plurality of filters is to be applied, where the information included in the video data bitstream identifies macroblocks corresponding to each filter by at least one of a listing of macroblock types or a range of quantization parameter values used to reconstruct the macroblocks. Alternatively or in addition, the computer code 590 may include code for determining pixels for which each filter of the plurality of filters is to be applied based on a predetermined measure of local characteristics of an image. In a particular embodiment, a first filter of the plurality of filters may be applied to first pixels having a first value of the predetermined measure of local characteristics of the image in a first range of values and a second filter of the plurality of filters is applied to second pixels having a second value of the predetermined measure of local characteristics of the image in a second range of values.

In a particular embodiment, the processor 510, the display controller 526, the memory 532, the CODEC 534, the wireless interface 540, and the camera interface 568 are included in a system-in-package or system-on-chip device 522. In a particular embodiment, an input device 530 and a power supply 544 are coupled to the system-on-chip device 522. Moreover, in a particular embodiment, as illustrated in FIG. 5, the display device 528, the input device 530, the speaker 536, the microphone 538, the wireless antenna 542, the video camera 570, and the power supply 544 are external to the system-on-chip device 522. However, each of the display device 528, the input device 530, the speaker 536, the microphone 538, the wireless antenna 542, the video camera 570, and the power supply 544 can be coupled to a component of the system-on-chip device 522, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method of decoding video data, the method comprising:
   receiving, from an encoded video bitstream, video data of a first unit of pixels of at least one frame, a second unit of pixels of the at least one frame, first filter selection information for the first unit of pixels, second filter selection information for the second unit of pixels, and filter data embedded in the encoded video bitstream;
   reconstructing pixel values of the pixels of the first and second units of the at least one frame using one of intra-frame prediction or inter-frame prediction;
   determining a first variance value of reconstructed pixel values for pixels of the first unit of pixels, wherein the first variance value is representative of a deviation of the reconstructed pixel values for pixels of the first unit of pixels from a value of the reconstructed pixel values for pixels of the first unit of pixels, wherein the first variance value is one of a first plurality of values that includes a first value and second value, the first value being different from the second value;
   determining a second variance value of reconstructed pixel values for pixels of the second unit of pixels, wherein the second variance value is representative of a deviation of the reconstructed pixel values for pixels of the second unit of pixels from a value of the reconstructed pixel values for pixels of the second unit of pixels, the first variance value being different from the second variance value, wherein the second variance value is one of a second plurality of values that includes a third value and fourth value, the third value being different from the fourth value;
   determining, for the first unit of pixels, a first plurality of filter coefficients based on the filter data, the first filter selection information, and the first variance value, comprising determining, using the first variance value, the first plurality of filter coefficients based on the first filter selection information received from the encoded video bitstream such that one plurality of filter coefficients is determined based on the first variance value for the pixels of the first unit of pixels being the first value and a different plurality of filter coefficients is determined based on the first variance value for the pixels of the first unit of pixels being the second value;
   applying the first plurality of filter coefficients to a first reconstructed pixel value of the first unit of pixels;
   determining, for the second unit of pixels, a second plurality of filter coefficients based on the filter data, the second filter selection information, and the second variance value, comprising determining, using the second variance value, the second plurality of filter coefficients based on the second filter selection information received from the encoded video bitstream such that one plurality of filter coefficients is determined based on the second variance value for the pixels of the second unit of pixels being the third value and a different plurality of filter coefficients is determined based on the second variance value for the pixels of the second unit of pixels being the fourth value, the second plurality of filter coefficients being determined to be different from the first plurality of filter coefficients; and
   applying the second plurality of filter coefficients to a second reconstructed pixel value of the second unit of pixels to produce filtered decoded pixel values of the first and second units of pixels.

2. The method of claim 1, wherein determining the first and second plurality of filter coefficients comprises determining whether the first and second variance values are in a specified range.

3. The method of claim 1, wherein the first unit of pixels comprises a first macroblock and the second unit of pixels comprises a second macroblock.

4. An apparatus for decoding video data, the apparatus comprising:
   a video decoding processor configured to receive, from an encoded video bitstream, video data of a first unit of pixels of at least one frame, a second unit of pixels of the at least one frame, first filter selection information for the first unit of pixels, second filter selection information for the second unit of pixels, and filter data embedded in the encoded video bitstream and further configured to reconstruct pixel values of the pixels of the first and second units of the at least one frame using one of intra-frame prediction or inter-frame prediction; and
   a memory configured to store the reconstructed pixel values of the first and second units of pixels;

wherein the video decoding processor is further configured to:

determine a first variance value of reconstructed pixel values for pixels of the first unit of pixels, wherein the first variance value is determined to be representative of a deviation of the reconstructed pixel values for pixels of the first unit of pixels from a value of the reconstructed pixel values for pixels of the first unit of pixels, wherein the first variance value is one of a first plurality of values that includes a first value and second value, the first value being different from the second value;

determine a second variance value of reconstructed pixel values for pixels of the second unit of pixels, wherein the second variance value is determined to be representative of a deviation of the reconstructed pixel values for pixels of the second unit of pixels from a value of the reconstructed pixel values for pixels of the second unit of pixels, the first variance value being different from the second variance value, wherein the second variance value is one of a second plurality of values that includes a third value and fourth value, the third value being different from the fourth value;

determine, for the first unit of pixels, a first plurality of filter coefficients based on the filter data, the first filter selection information, and the first variance value, the first plurality of filter coefficients being determined using the first variance value based on the first filter selection information received from the encoded video bitstream such that one plurality of filter coefficients is determined based on the first variance value for the pixels of the first unit of pixels being the first value and a different plurality of filter coefficients is determined based on the first variance value for the pixels of the first unit of pixels being the second value;

apply the first plurality of filter coefficients to a first reconstructed pixel value of the first unit of pixels;

determine for the second unit of pixels, a second plurality of filter coefficients based on the filter data, the second filter selection information, and the second variance value, the second plurality of filter coefficients being determined for using the second variance value based on the second filter selection information received from the encoded video bitstream such that one plurality of filter coefficients is determined based on the second variance value for the pixels of the second unit of pixels being the third value and a different plurality of filter coefficients is determined based on the second variance value for the pixels of the second unit of pixels being the fourth value, the second plurality of filter coefficients being determined to be different from the first plurality of filter coefficients; and apply the second plurality of filter coefficients to a second reconstructed pixel value of the second unit of pixels to produce filtered decoded pixel values of the first and second units of pixels.

5. The apparatus of claim 4, wherein to determine the first and second plurality of filter coefficients, the video decoding processor is configured to determine whether the first and second variance values are in a specified range.

6. The apparatus of claim 4, wherein the first unit of pixels comprises a first macroblock and the second unit of pixels comprises a second macroblock.

7. The apparatus of claim 4, further comprising a display device configured to display filtered decoded video data including the filtered decoded pixel values.

8. The method of claim 1, wherein determining the first variance value comprises determining the first variance value to be representative of the deviation of the reconstructed pixel values for pixels of the first unit of pixels from a mean value of the reconstructed pixel values for pixels of the first unit of pixels.

9. The method of claim 1, wherein determining the second variance value comprises determining the second variance value to be representative of the deviation of the reconstructed pixel values for pixels of the second unit of pixels from a mean value of the reconstructed pixel values for pixels of the second unit of pixels.

10. The apparatus of claim 4, wherein to determine the first variance value, the video decoding processor is configured to determine the deviation of the reconstructed pixel values for pixels of the first unit of pixels from a mean value of the reconstructed pixel values for pixels of the first unit of pixels.

11. The apparatus of claim 4, wherein to determine the second variance value, the video decoding processor is configured to determine the deviation of the reconstructed pixel values for pixels of the second unit of pixels from a mean value of the reconstructed pixel values for pixels of the second unit of pixels.

12. The method of claim 1, wherein the first plurality of filter coefficients are determined, for the first variance value, from a set of different filter coefficients based on the first filter selection information received from the encoded video bitstream, and wherein the second plurality of filter coefficients are determined, for the second variance value, from the set of different filter coefficients based on the second filter selection information received from the encoded video bitstream.

13. The apparatus of claim 4, wherein the video decoding processor is configured to:
determine, for the first variance value, the first plurality of filter coefficients from a set of different filter coefficients based on the first filter selection information received from the encoded video bitstream; and
determine, for the second variance value, the second plurality of filter coefficients from the set of different filter coefficients based on the second filter selection information received from the encoded video bitstream.

* * * * *